(12) United States Patent
Sottos et al.

(10) Patent No.: US 12,533,441 B2
(45) Date of Patent: Jan. 27, 2026

(54) ELASTOMER WITH TUNABLE PROPERTIES AND METHOD OF RAPIDLY FORMING THE ELASTOMER

(71) Applicant: The Board of Trustees of the University of Illinois, Urbana, IL (US)

(72) Inventors: Nancy R. Sottos, Champaign, IL (US); Jeffrey S. Moore, Savoy, IL (US); Leon M. Dean, Minneapolis, MN (US); Qiong Wu, Champaign, IL (US); Omar Alshangiti, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 685 days.

(21) Appl. No.: 17/910,132

(22) PCT Filed: Mar. 10, 2021

(86) PCT No.: PCT/US2021/021656
§ 371 (c)(1),
(2) Date: Sep. 8, 2022

(87) PCT Pub. No.: WO2021/188332
PCT Pub. Date: Sep. 23, 2021

(65) Prior Publication Data
US 2023/0096431 A1 Mar. 30, 2023

Related U.S. Application Data

(60) Provisional application No. 62/991,781, filed on Mar. 19, 2020.

(51) Int. Cl.
*C08G 61/08* (2006.01)
*A61L 27/22* (2006.01)

(52) U.S. Cl.
CPC ............ *A61L 27/22* (2013.01); *C08G 61/08* (2013.01); *C08G 2261/3321* (2013.01); *C08G 2261/3322* (2013.01)

(58) Field of Classification Search
CPC .................................................. C08G 61/08
See application file for complete search history.

(56) References Cited

U.S. PATENT DOCUMENTS 3,260,708 A 7/1966 Natta et al.
6,057,406 A 5/2000 Pojman et al.
(Continued)

FOREIGN PATENT DOCUMENTS

CN 101553287 B 9/2012
GB 2005280 A * 4/1979 ............. C08G 61/08
(Continued)

OTHER PUBLICATIONS

KR 10-2018-0044489 A (May 3, 2018); machine translation. (Year: 2018).*

(Continued)

*Primary Examiner* — Rip A Lee
(74) *Attorney, Agent, or Firm* — Crowell & Moring LLP (57) ABSTRACT

A method of rapidly forming an elastomer with tunable properties is described herein. The method includes preparing a monomer solution comprising a catalyst and one or more monomers including 1,5-cyclooctadiene (COD). The one or more monomers may further include dicyclopentadiene (DCPD), and each of the COD and the DCPD may be present in the monomer solution at a predetermined volume percentage. A region of the monomer solution is activated to initiate an exothermic polymerization reaction and generate a self-propagating polymerization front, which moves (Continued)

through the monomer solution and polymerizes the one or more monomers. Thus, an elastomer having predetermined properties is rapidly formed.

20 Claims, 7 Drawing Sheets

(56) References Cited

U.S. PATENT DOCUMENTS

| | | | |
|---|---|---|---|
| 6,489,415 B2 * | 12/2002 | Hsu | C08F 136/06 526/335 |
| 6,776,932 B1 | 8/2004 | Ilyashenko | |
| 7,151,146 B1 * | 12/2006 | Kwag | C08F 36/04 423/445 B |
| 10,487,446 B2 | 11/2019 | Robertson et al. | |
| 2010/0155998 A1 | 6/2010 | Rule et al. | |
| 2012/0213969 A1 | 8/2012 | Mather et al. | |
| 2014/0275595 A1 | 9/2014 | Wampler et al. | |
| 2018/0230642 A1 | 8/2018 | Robertson et al. | |
| 2018/0327531 A1 | 11/2018 | Moore et al. | |

FOREIGN PATENT DOCUMENTS

| | | | |
|---|---|---|---|
| GB | 2005280 A1 | 4/1979 | |
| KR | 10-2018-0044489 A * | 5/2018 | C08G 61/08 |

OTHER PUBLICATIONS

Second Chinese Office Action from related application CN 202180021814.1, Jul. 31, 2024, 27 pp.
Michel et al., "Tuning the properties of α,ω-bis(trialkoxysilyl) telechelic copolyolefins from ruthenium-catalyzed chain-transfer ring-opening metathesis polymerization (ROMP)," *Polymer Chemistry*, 8 (7), pp. 1177-1187.
Extended European Search Report from related application EP21771591. 1, Mar. 20, 2024, 9 pp.
Chinese Office Action and English translation from corresponding application CN 202180021814.1, Oct. 24, 2023, pp. 1-31.
Allaert et al., "Secondary metathesis with Grubbs catalysts in the 1,4-polybutadiene system," Catal. Commun. 9 (2008), pp. 1054-1059.
Alazari et al., "Effect of Limonene on the Frontal Ring Opening Metathesis Polymerization of Dicyclopentadiene," J. Polym. Sci. Part A: Polym. Chem. 45 (2016), pp. 63-68.
Chekanov et al., "Fronatl Curing of Epoxy Resins: Comparison of Mechanical and Thermal Properties to Batch-Cured Materials," J. Appl. Polym. Sci. 66 (1997)), pp. 1209-1216.
Chen et al., "Polyurethane-Nanosilica Hybrid Nanocomposites Synthesized by Frontal Polymerization," Polym. Sci. Part A: Polym. Chem. 43 (2005), pp. 1670-1680.
Goli et al., "Frontal Polymerization of Dicyclopentadiene: A Numerical Study," J. Phys. Chem. B, 122 (2018), pp. 4583-4591.
Hillmyer et al., "Utility of a Ruthenium Metathesis Catalyst for the Preparation of End-Functionalized Polybutadiene," Macromolecules, 30 (1997), pp. 718-721.
Holt et al., "Cure-on-demand Wood Adhesive Based on the Frontal Polymerization of Acrylates," J. Appl. Polym. Sci. 133 (2016), pp. 1-5.
Ilker et al., "Alternating Copolymerizations of Polar and Nonpolar Cyclic Olefins by Ring-Opening Metathesis Polymerization," Macromolecules, 35 (2002), pp. 54-58.
Khan et al., "Readily Accessible and Easily Modifiable Ru-Based Catalysts for Efficient and Z-Selective Ring-Opening Metathesis Polymerization and Ring-Opening/Cross-Metathesis," J. Am. Chem. Soc. 135 (2013), pp. 10258-10261.
Khoury et al., "Ring Strain Energies: Substituted Rings, Norbornanes, Norbornenes and Norbornadienes," Tetrahedron, 60 (2004), pp. 8103-8112.
Liu et al., "Review of progress in shape-memory polymers," Mater. Chem. 17, (2007), pp. 1543-1558.
Makhiyanov, "Glass Transition Temperature and Microstructure of Polybutadienes," Polym. Sci., Ser. A, 52, 12 (2010), pp. 1292-1300.
Mariani et al., "UV-Ignited Frontal Polymerization of an Epoxy Resin," Polym. Sci. Part A: Polym. Chem. 42 (2004), pp. 2066-2072.
Martinez et al., "Ring-Opening Metathesis Polymerization of 8-Membered Cyclic Olefins," Polym. Chem. 5, (2014), pp. 3507-3532.
Michel et al., "Tuning the Properties of α,ωvus(trialkoxysilyl) Telechelic Copolyolefins from Ruthenium-Catalyzed Chain-Transfer Ring-Opening Metathesis Polymerization (ROMP)," Polym. Chem. 8 (2017), pp. 1177-1187.
Morita et al., "A Ring-Opening Metathesis Polymerization (ROMP) Approach to Carboxyl- and Amino-Terminated Telechelic Poly(butadiene)s," Macromolecules 33 (2000), pp. 6621-6623.
Nuvoli, et al., "Synthesis and Characterization of Functionally Gradient Materials Obtained by Frontal Polymerization," ACS Appl. Mater. Interfaces, 7 (2015), pp. 3600-3606.
Pojman et al., "Traveling Fronts of Methacrylic Acid Polymerization," J. Am. Chem. Soc. 113 (1991), pp. 6284-6286.
Robertson et al., "Rapid Stiffening of a Microfluidic Endoskeleton via Frontal Polymerization," ACS Appl. Mater. Interfaces, 6 (2014), pp. 18469-18474.
Ruiu et al., "Advances in the Frontal Ring Opening Metathesis Polymerization of Dicyclopentadiene," J. Polym. Sci. Part A: Polym. Chem. 52 (2014), pp. 2776-2780.
Vitale et al., "A Unified Approach for Patterning via Frontal Photopolymerization," Adv. Mater. 27, (2015), pp. 6118-6124.
Washington et al., "Frontal Polymerization Synthesis of Temperature-Sensitive Hydrogels," J. Am. Chem. Soc. 123 (2001), pp. 7933-7934.
Yan et al., "Frontal Polymerization Synthesis of Monolithic Macroporous Polymers," Adv. Funct. Mater. 17 (2007), pp. 3355-3362.
International Search Report and Written Opinion from corresponding international application No. PCT/US21/21656, May 19, 2021, 11 pp.
Luo, Y. et al., "A General Approach Towards Thremoplastic Multishape-Memory Polymers via Sequence Structure Design", Advanced Materials, 25, 5 (2013) pp. 743-748.
Dean, L. M. et al., "Rapid Synthesis of Elastomers and Thermosets with Tunable Thermomechanical Properties", ACS Macro Letters, 9, 6 (2020) pp. 819-824.
Robertson, I. D. et al., "Frontal Ring-Opening Metathesis Polymerization of Exo-Dicyclopentadiene for Low Catalyst Loadings", ACS Macro Letters, 5, 5 (2016) pp. 593-596.
Robertson, I. D. et al., "Rapid Energy-Efficient Manufacturing of Polymers and Composites via Frontal Polymerization", Nature, 557 (2018) pp. 223-227.
Robertson, I. D. et al., "Alkyl Phosphate Inhibitors for Frontal Ring-Opening Metathesis Polymerization Greatly Increase Pot Life", ACS Macro Letters, 6 (2017) pp. 609-612.
Mariani, A. et al., "Frontal Ring-Opening Metathesis Polymerization of Dicyclopentadiene", Macromolecules, 34, 19 (2001) pp. 6539-6541.
Rejection Decision from Chinese Office Action from related application CN 202180021814.1 dated Dec. 21, 2024, 24 pp.
European Search Report from related application EP 21771591.1, dated Jun. 25, 2025, 5 pp.

* cited by examiner

ELASTOMER WITH TUNABLE PROPERTIES AND METHOD OF RAPIDLY FORMING THE ELASTOMER

RELATED APPLICATION

The present patent document is the U.S. national stage of International Application No. PCT/US2021/021656, which was filed on Mar. 10, 2021, and claims the benefit of priority under 35 U.S.C. § 119 (e) to U.S. Provisional Patent Application No. 62/991,781, which was filed on Mar. 19, 2020. Both of the preceding patent applications are hereby incorporated by reference in their entirety.

FEDERALLY SPONSORED RESEARCH OR DEVELOPMENT

This invention was made with government support under FA9550-16-1-0017 awarded by the Air Force Office of Scientific Research (AFOSR) and DE-FG02-07ER46471 awarded by the U.S. Department of Energy. The government has certain rights in the invention.

TECHNICAL FIELD

The present disclosure is related generally to polymer processing and more particularly to a method of producing elastomers using frontal polymerization.

BACKGROUND

Frontal polymerization, or frontal ring-opening metathesis polymerization ("FROMP"), is a promising technique for rapid, energy-efficient manufacturing of bulk polymeric materials. In frontal polymerization, a monomer is converted to polymer within a localized reaction zone that propagates spatially as a consequence of heat transfer from the exothermic polymerization reaction to the unreacted monomer. A minimal amount of energy is required to initiate the process, after which the polymerization front may continue to propagate without further energy input. Although frontal polymerization has been demonstrated for a number of monomers, the production of commodity polymers and polymers with tunable properties remains an elusive goal.

BRIEF SUMMARY

An elastomer with tunable properties and a method of rapidly forming the elastomer are described herein.

According to one embodiment, the method may include preparing a monomer solution comprising a catalyst and one or more monomers including 1,5-cyclooctadiene (COD). A region of the monomer solution is activated to initiate an exothermic polymerization reaction and generate a self-propagating polymerization front, which moves through the monomer solution and polymerizes the one or more monomers. Thus, an elastomer is rapidly formed.

According to another embodiment, the method may include preparing a liquid monomer solution comprising a catalyst and monomers including 1,5-cyclooctadiene (COD) and dicyclopentadiene (DCPD), where the COD and DCPD have a predetermined volume ratio. A region of the monomer solution is activated to initiate an exothermic polymerization reaction and generate a self-propagating polymerization front, which moves through the monomer solution and polymerizes the monomers. Thus, an elastomer having tunable properties is rapidly formed.

The elastomer having tunable or predetermined properties comprises polybutadiene or a copolymer and is formed by: preparing a monomer solution comprising a catalyst and one or more monomers including 1,5-cyclooctadiene (COD) and optionally dicyclopentadiene (DCPD), and activating a region of the monomer solution to initiate an exothermic polymerization reaction and generate a self-propagating polymerization front. The self-propagating polymerization front moves through the monomer solution and polymerizes the one or more monomers, thereby rapidly forming the elastomer.

DETAILED DESCRIPTION

Described in this disclosure is a frontal polymerization method for the rapid formation of elastomers with tunable or predetermined properties. New monomer formations described herein allow for the fabrication of polymers and copolymers with vastly different properties than those previously produced using frontal polymerization. For example, the new monomer formulations allow for the tuning of glass transition temperature in the frontally-polymerized elastomer over a range of 200° C., and tensile modulus may be adjusted over a range of three orders of magnitude. In addition, copolymers exhibiting a spatial gradient in glass transition temperature, composition and/or mechanical properties may be fabricated by frontal polymerization.

It is noted that the term "elastomer(s)" is broadly used in this disclosure to refer to polymers and copolymers that exhibit elastomeric behavior above the glass transition temperature ($T_g$), where $T_g$ may be above or below room temperature. When $T_g$ is above room temperature, such polymers and copolymers may be more typically referred to as thermosetting polymers or thermosets.

Figure 1:
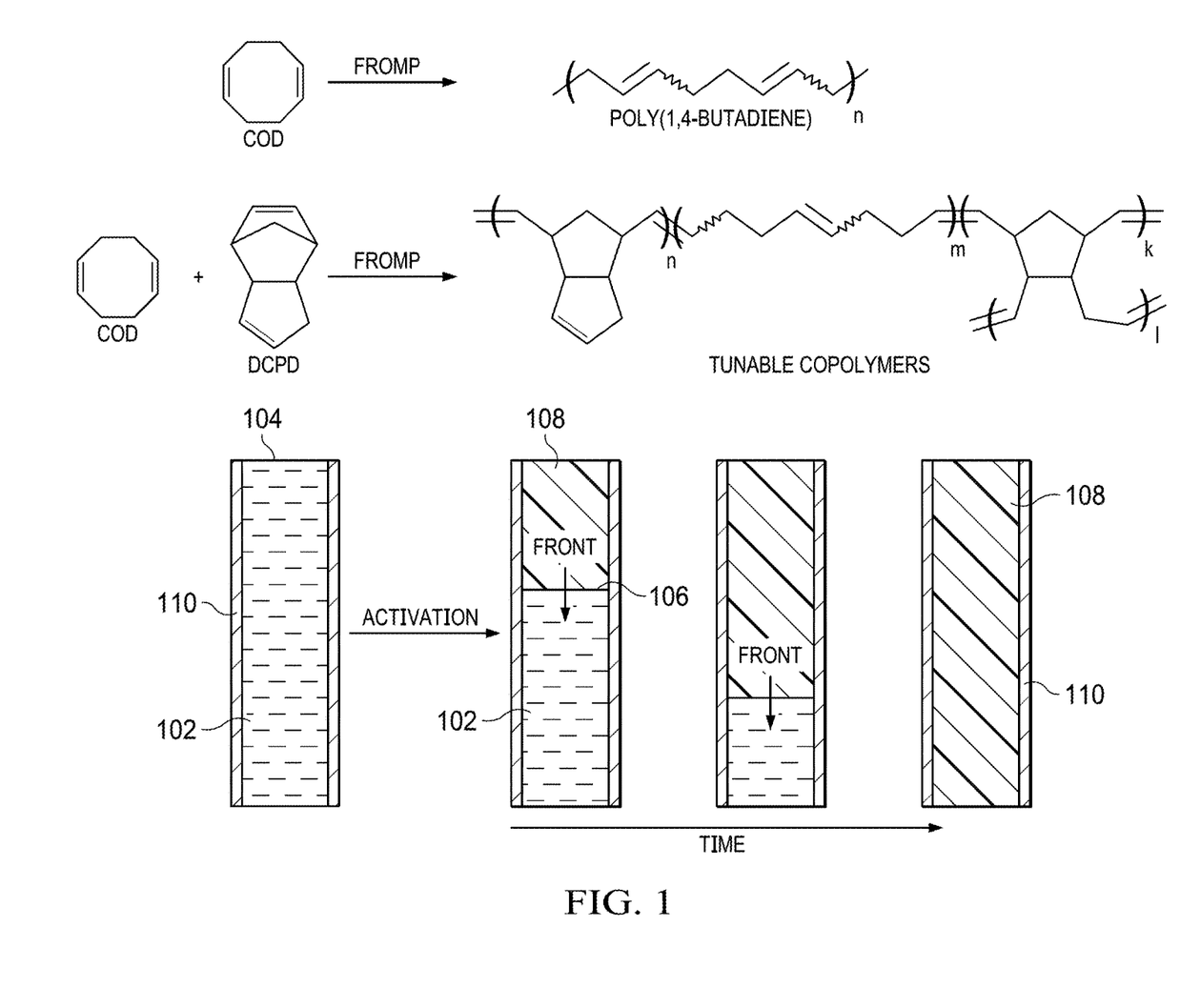
FIG. 1 illustrates frontal polymerization of a monomer solution comprising COD and optionally DCPD to form an elastomer comprising polybutadiene or a copolymer.

Referring to FIG. 1, the method includes preparing a monomer solution 102 comprising a catalyst and one or more monomers including 1,5-cyclooctadiene (COD). The monomer solution 102 may further include dicyclopentadiene (DCPD), in which case the monomer solution 102 may be referred to as a co-monomer solution or mixture. When both COD and DCPD are included in the monomer solution 102, the monomers may be included at a predetermined volume ratio, or at a predetermined volume percentage of the COD or DCPD, as discussed below. A region 104 of the monomer solution 102 is activated to initiate an exothermic polymerization reaction and generate a self-propagating polymerization front 106. The catalyst present in the monomer solution 102 may facilitate the reaction. As the self-propagating polymerization front 106 moves through the monomer solution 102, the one or more monomers are polymerized, and an elastomer 108 is rapidly formed. The monomer solution 102 is typically in a liquid state, and thus may be referred to as a liquid monomer solution, until the polymerization front 106 passes through. Accordingly, the monomer solution 102 may be prepared in a mold or other container 110. After frontal polymerization, the elastomer 108 may exhibit a degree of cure of 95% or higher and no post-curing may be needed. The frontally-polymerized elastomer 108 may have a size and shape determined by the mold or container 110, and optionally may be further processed (e.g., by machining or cutting) to a desired size and shape.

The exothermic polymerization reaction may be activated by heating a local or global region (referred to as "the region") 104 of the monomer solution 102 or, in some cases, by exposing the region 104 to light, electric current or another activator. Activation (e.g., heating) of the exothermic polymerization reaction may be transient, lasting for less than one minute or even less than one second. In other words, after initiation of the exothermic polymerization reaction, no external activation is required. Heat may be applied by conduction, convection, or radiation. For example, heat may be applied conductively by physically contacting a heated element (such as a soldering iron, electrical resistive heater, resistive wire, hot plate, etc.) to the monomer solution at one or more locations. Activation of the local or global region of the monomer solution 102 by any mechanism (e.g., heating, light illumination and/or electricity) may encompass activation from inside or outside the monomer solution 102. In addition to the catalyst mentioned above, the monomer solution 102 may further include an inhibitor to help control propagation of the polymerization front 106, as discussed further below.

Advantageously, frontal polymerization may occur rapidly. For example, the polymerization front 106 may move through the monomer solution at a rate of at least about 3 cm/min (0.5 mm/s), at least about 7 cm/min (1.2 mm/s), and in some cases as high as, or even higher than, about 10 cm/min (1.6 mm/s). Depending on the monomer(s) present and possibly other factors, such as boundary/initial conditions (e.g., thermal diffusivity of mold/container, ambient temperature, monomer solution temperature) and/or catalyst concentration, the rate of propagation of the polymerization front 106 may range from 0.5 cm/min to about 10 cm/min or higher. The polymerization front may have a linear shape, a curved shape or another shape, which may be influenced by the geometry of the region where polymerization is initiated, the type of monomer solution, and/or other factors. Typically the polymerization front is smooth and stable, but in some cases the polymerization front may exhibit irregularities or instabilities as it propagates through the monomer solution. The direction of propagation of the front may be referred to as a downstream direction.

Preferably, the activation takes place shortly after preparation of the monomer solution 102 to prevent premature curing or gelation. For example, activation may take place within one or two hours of preparing the monomer solution 102. Due to the liquid state of the monomer solution prior to polymerization, the monomer solution may have a storage modulus of less than 1 Pa. Preparation of the monomer solution 102 may comprise forming a mixture of the one or more monomers, a catalyst and an inhibitor. The mixing may entail mechanical stirring and/or sonication. The mixture may optionally include an organic solvent. For example, prior to mixing with the inhibitor and one or more monomers, the catalyst may be dispersed and/or dissolved in an organic solvent. The preparation may take place at room temperature (e.g., 20-25° C.). In some cases, after mixing, the monomer solution may be passed through basic alumina for purification of the one or more monomers. Alternatively, before mixing, the one or more monomers may be passed through basic alumina for purification. The mold or container in which the monomer solution is polymerized may be preheated to a low temperature (e.g., to 30-60° C.) prior to frontal polymerization.

Figure 2:
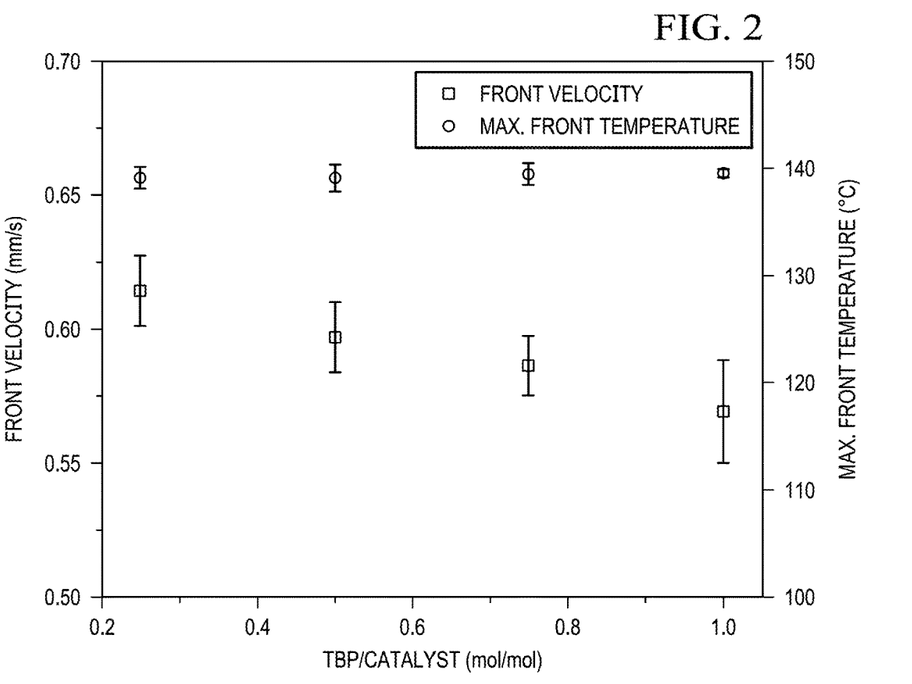
FIG. 2 shows the variation in front velocity and maximum front temperature with inhibitor/catalyst concentration.

To control frontal polymerization, each of the catalyst and inhibitor may be provided at a suitable concentration to influence the polymerization rate and the peak temperature of the monomer solution. For example, more catalyst can be added or the inhibitor concentration can be reduced to increase the peak temperature and/or the velocity of the polymerization front. The catalyst may comprise a $2^{nd}$ generation Grubbs catalyst (GC2) or another ruthenium catalyst. The inhibitor may comprise trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF). Catalyst ranges from about 5 ppm to about 500 ppm, or more typically from about 50 ppm to about 300 ppm may be suitable, and inhibitor ranges from about 0.1 eq. to about 8 eq., or more typically from about 0.25 eq. to about 4 eq., with respect to the catalyst may be employed. FIG. 2 illustrates the influence of the catalyst and inhibitor on polymerization front velocity and maximum front temperature for a monomer solution including COD as the only monomer with GC2 (90 ppm) and TBP as the catalyst and inhibitor, respectively.

In an example in which COD is the only monomer employed in the monomer solution, the elastomer may be polybutadiene, or more specifically poly(1,4-butadiene), a synthetic rubber. Poly(1,4-butadiene) comprises a monomeric unit that may arrange in different molecular configurations (cis-(1,4) and/or trans-(1,4)), which may in turn affect the macroscopic properties of the synthetic rubber. Poly(1,4-butadiene) synthesized by frontal polymerization typically has a predominantly trans conformation (e.g., 86-90% trans). The frontally polymerized poly(1,4-butadiene) may have a number average molecular weight in a range from about 200-240 kg/mol. Experiments carried out using a monomer solution comprising COD, with TBP as an inhibitor and GC2 as a catalyst, show that frontal polymerization may be initiated with only a small input of heat, and the heat released ($H_r$=204±5 J g$^{-1}$) during the reaction is sufficient to activate GC2 ahead of the polymerization front, thereby sustaining stable propagation of the reaction front. The rate or velocity of the polymerization front may be at least 0.6 mm s$^{-1}$ and is suitable for a time-efficient manufacturing process. After polymerization, the frontally polymerized poly(1,4-butadiene) may slowly crystallize into a relatively rigid polymer at room temperature, which is typically undesirable for a synthetic rubber. It has been found that incorporation of an additional monomer into the monomer solution can help to suppress crystallization after frontal polymerization and provide other benefits.

Accordingly, the monomer solution may comprise dicyclopentadiene (DCPD) in addition to COD. By controlling the volume ratio of the co-monomers in the monomer solution, it is possible to produce an elastomer (or copolymer) that resists room temperature crystallization. Since the degree of cross-linking in the elastomer increases as a function of DCPD volume fraction, it is hypothesized that the presence of an additional monomer and the additional cross-linking sites help to inhibit crystallization. In addition, the copolymer may have other characteristics or properties that depend on the volume ratio of the monomers. The monomer solution may include from 1 vol. % to 95 vol. % DCPD, where the vol. % is determined based on the total volume of the one or more monomers in the monomer solution. For example, for the co-monomers COD and DCPD, vol. % DCPD=(volume of DCPD/(volume of DCPD+volume of COD))×100; vol. % COD=(volume of COD/(volume of DCPD+volume of COD))×100). Experiments suggest the desired suppression of crystallization may be most effective above about 15 vol. % DCPD. Accordingly, the monomer solution preferably contains at least 15 vol. % DCPD, and/or from 5 vol. % to about 85 vol. % COD.

Notably, the glass transition temperature ($T_g$) of frontally-polymerized (poly(1,4-butadiene) is sufficiently low to provide good elastomeric properties as long as crystallization is prevented. The glass transition temperature (or $T_g$) may be understood to refer to a single temperature or to a range of temperatures at which the elastomer transitions from a rubbery elastomer to a rigid elastomer upon cooling. Elastomers prepared by frontal polymerization, which includes poly(1,4-butadiene) prepared from COD or copolymers prepared from COD and DCPD ("COD/DCPD copolymers"), may have a $T_g$ below room temperature, such as 15° C. or lower, −15° C. or lower, −30° C. or lower, or −60° C. or lower, such that the elastomers behave as elastomeric polymers at room temperature (e.g., 20-25° C.). It has been found that the volume ratio of the co-monomers in the monomer solution affects not only the resistance of the frontally-polymerized elastomer to crystallization but also the $T_g$. For example, elastomers obtained by frontal polymerization of a monomer solution comprising at least about 30 vol. % COD and up to 100 vol. % COD may exhibit a $T_g$ below room temperature, and the $T_g$ may decrease as the volume percentage of COD increases, as illustrated by the data in FIG. 3 obtained from copolymers prepared by frontal polymerization of co-monomer mixtures of COD and DCPD. Since it is generally preferred to avoid crystallization, monomer solutions for fabricating elastomeric polymers may include from about 30 vol. % COD to about 85 vol. % COD. When room temperature mechanical properties are considered, as discussed below, the preferred volume ratio of monomers to obtain elastomeric behavior may be further refined.

Figure 3:
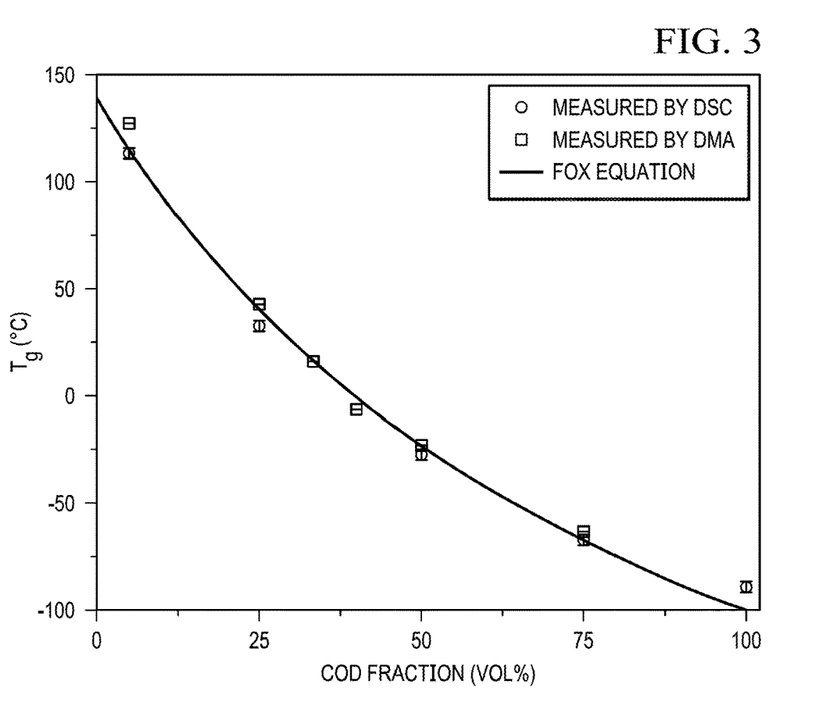
FIG. 3 shows $T_g$ values for elastomers formed by frontal polymerization as a function of COD volume percentage.

For some applications, the volume ratio of COD to DCPD may be selected to produce an elastomer having a glass transition temperature at or above room temperature. Such elastomers may be more commonly referred to as thermosetting polymers since they do not exhibit elastomeric behavior at room temperature. As illustrated in FIG. 3, COD/DCPD copolymers formed by frontal polymerization of a monomer solution comprising less than about 30 vol. % COD (and/or greater than about 70 vol. % DCPD) may have a glass transition temperature above room temperature, such as at least about 30° C., at least about 50° C., or at least about 70° C. Such copolymers may exhibit what can be described as cold drawing behavior instead of elastomeric behavior at room temperature, and also may be employed as shape memory polymers, as discussed below. Notably, the data of FIG. 3 reveal that $T_g$ values of the copolymers prepared by frontal polymerization may vary monotonically with the co-monomer ratio between −90° C. and 114° C. The variation of $T_g$ with co-monomer ratio closely follows the Fox equation for random copolymers, indicating that the co-monomers (COD and DCPD) may be statistically incorporated into the copolymer during frontal polymerization without phase separation.

Control of the $T_g$ and cross-linking density (via manipulation of the volume ratio of co-monomers) may enable the tuning of mechanical properties of the copolymers prepared by frontal polymerization. The influence of volume fraction of COD on room temperature mechanical properties is illustrated by the tensile data of FIG. 4, where tensile modulus, tensile strength, and elongation are plotted as a function of COD fraction for COD/DCPD copolymers prepared by frontal polymerization. At room temperature, the tensile modulus varies over three orders of magnitude, from 3.2 MPa to nearly 1900 MPa (1.9 GPa), and the tensile strength varies 40-fold, from 1.3 to 52 MPa (see also Table 1). For comparison, frontally-polymerized poly(1,4-butadiene) prepared from COD (100 vol. %) exhibits a tensile modulus of 3 MPa, a tensile strength of 1.5 MPa, and an elongation at failure of at least about 1200% when tested at room temperature.

TABLE 1

Properties of polymers prepared via FROMP

| Sample Type | COD fraction [vol %] | DCPD fraction [vol %] | $T_g$ [° C.][a] | $T_g$ [° C.][b] | Tensile modulus [MPa][c] | Tensile strength [MPa][c] | Elongation at failure [%][c] |
|---|---|---|---|---|---|---|---|
| FPCOD (this study) | 100 | 0 | −89.7 ± 0.4 | — | 3.1 ± 0.8 | 1.48 ± 0.39 | 1280 ± 210 |
| | 75 | 25 | −67.0 ± 1.0 | −63.0 ± 0.9 | 3.2 ± 0.2 | 1.30 ± 0.01 | 123 ± 6 |
| | 50 | 50 | −27.8 ± 1.7 | −23.2 ± 0.5 | 5.6 ± 0.6 | 1.77 ± 0.03 | 176 ± 2 |
| COD-DCPD copolymers (this study) | 40 | 60 | — | −6.2 ± 0.9 | 6.1 ± 0.3 | 2.61 ± 0.30 | 300 ± 18 |
| | 33 | 67 | — | 16.5 ± 0.3 | 48 ± 13 | 13.4 ± 3.0 | 446 ± 69 |
| | 25 | 75 | 32.1 ± 1.6 | 43.1 ± 0.5 | 1390 ± 150 | 31.8 ± 2.8 | 284 ± 78 |
| | 5 | 95 | 113.8 ± 0.5 | 126.8 ± 0.3 | 1870 ± 70 | 52.1 ± 0.7 | 72 ± 40 |

TABLE 1-continued

Properties of polymers prepared via FROMP

| Sample Type | COD fraction [vol %] | DCPD fraction [vol %] | $T_g$ [° C.][a] | $T_g$ [° C.][b] | Tensile modulus [MPa][c] | Tensile strength [MPa][c] | Elongation at failure [%][c] |
|---|---|---|---|---|---|---|---|
| pDCPD[11,14] | 0[d] | 95[d] | 128[11] | — | 1950 ± 50[e)[14]] | 52.0 ± 0.1[e)[14]] | — |

Reported values are mean ± s.d. for at least 3 independent tests.
[a]Measured by DSC.
[b]Measured by DMA using the maximum of tan(δ).
[c]Measured according to ASTM standard D638 with type IV dogbone samples and an extension rate of 50 mm min⁻¹, unless otherwise indicated.
[d]Contains 5 vol % of 5-ethylidene 2-norbornene as a co-monomer.
[e]Measured according to ASTM standard D638 with type I dogbone samples and an extension rate of 5 mm min⁻¹.

Figure 5:
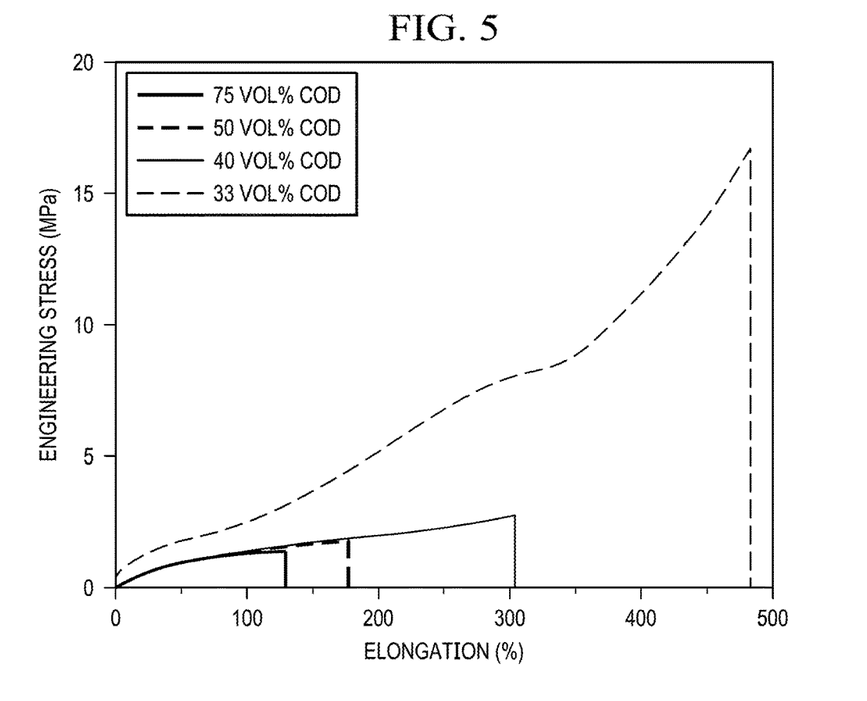
FIG. 5 shows engineering stress versus elongation for elastomers formed by frontal polymerization with greater than 30 vol. % COD.
Figure 6:
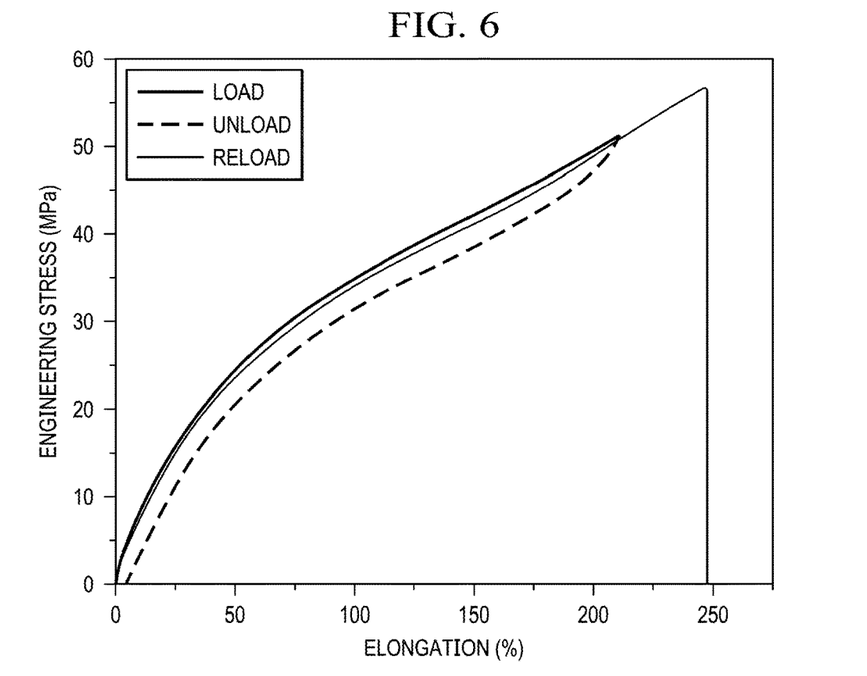
FIG. 6 shows engineering stress versus elongation for an elastomeric copolymer produced by frontal polymerization with 40 vol. % COD, where the copolymer is subjected to loading, unloading and reloading.

Copolymers prepared from at least about 30 vol. % COD (e.g., 33 vol. % COD or greater) have a $T_g$ below room temperature and exhibit elastomeric behavior, with recoverable elastic deformation until failure and no observed yielding, as evidenced in FIG. 5. Minimal hysteresis is observed when these elastomeric copolymers are unloaded prior to failure and reloaded, as evidenced in FIG. 6, which shows tensile test data for an elastomeric copolymer produced by frontal polymerization from a monomer solution comprising 40 vol. % COD, where the copolymer is subjected to loading, unloading and reloading at 50 mm/min. Qualitatively, these elastomers exhibit robust behavior, with immediate recovery through multiple cycles of deformation. The results presented in this disclosure are believed to represent the first demonstration of robust elastomers prepared via frontal polymerization. Among the elastomeric copolymers evaluated, the copolymer with 33 vol. % COD is found to exhibit the highest elongation at failure of 450%±70% and tensile strength of 13 MPa±3 MPa.

This work reveals that COD/DCPD copolymers prepared by frontal polymerization from monomer solutions including from about 30 vol. % to about 40 vol. % COD may exhibit excellent room temperature mechanical properties, such as a tensile strength in a range from about 3 MPa to about 20 MPa, and/or an elongation at failure in a range from about 300% to about 520%. Accordingly, a COD/DCPD copolymer that exhibits excellent elastomeric behavior at room temperature may be frontally-polymerized from a monomer solution including at least about 30 vol. % COD, or at least about 33 vol. % COD, and preferably no more than about 43 vol. % COD, no more than about 40 vol. % COD, or no more than about 37 vol. % COD.

Figure 4:
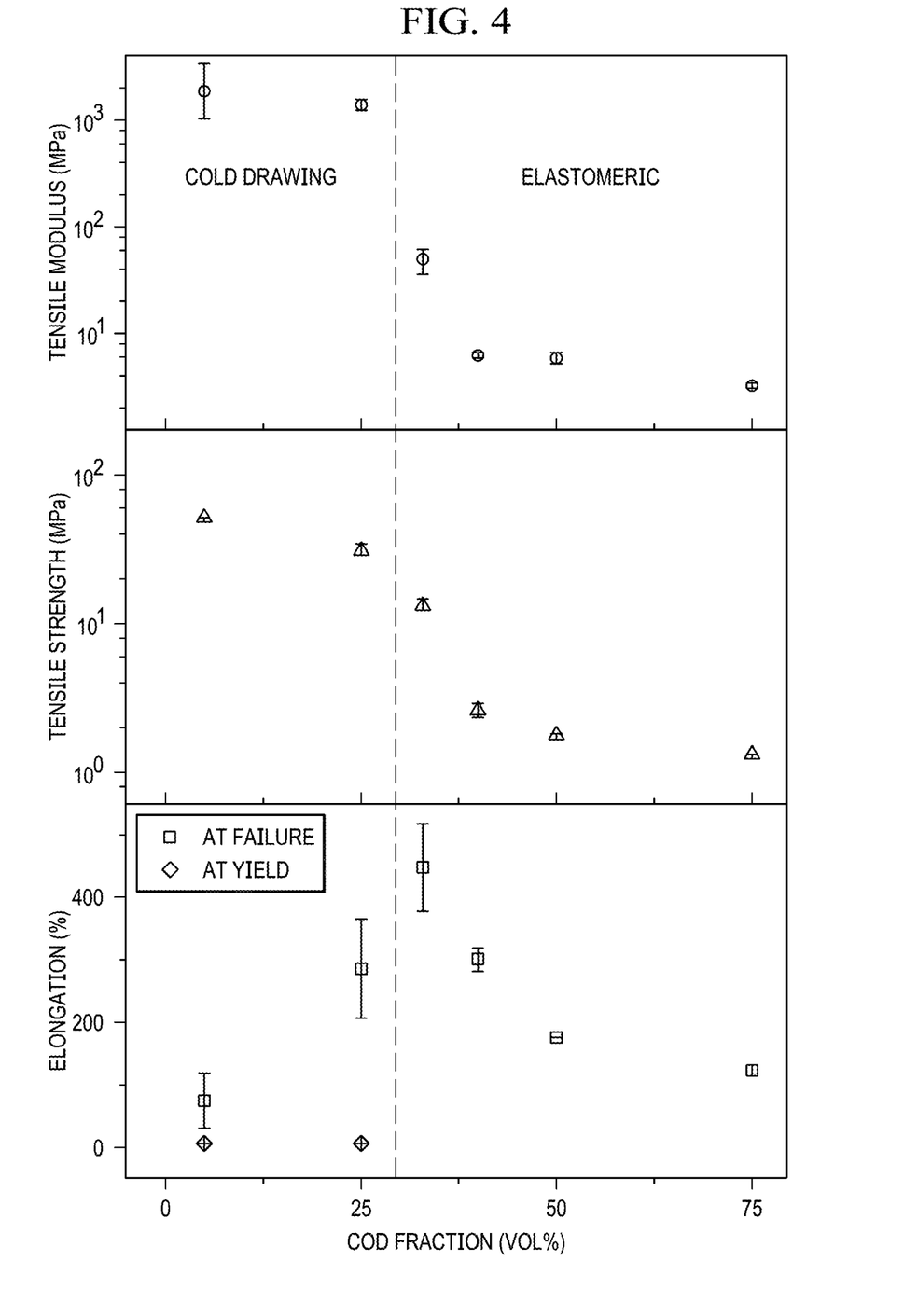
FIG. 4 shows the variation in room temperature mechanical properties for elastomers formed by frontal polymerization as a function of COD volume percentage.
Figure 7:
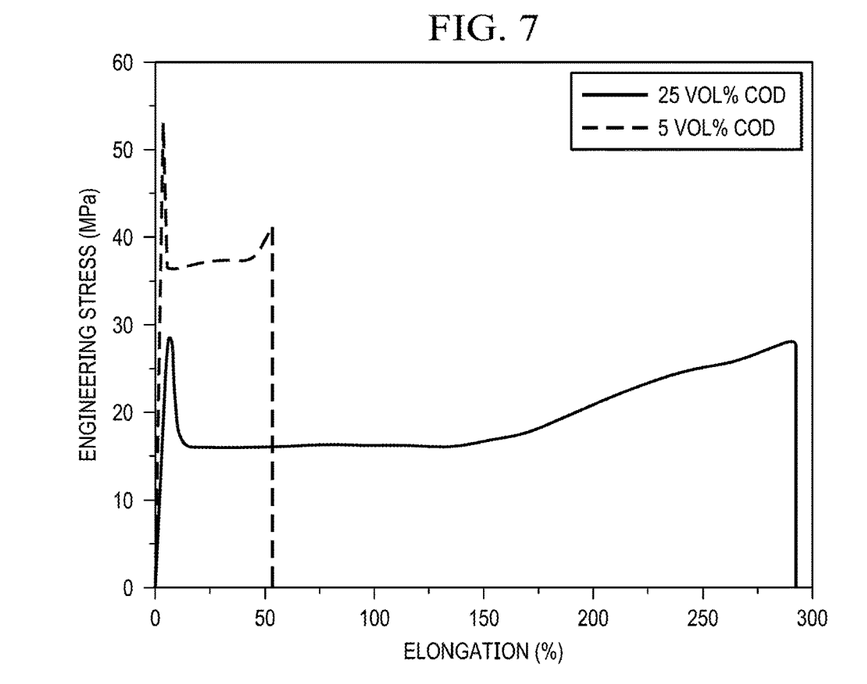
FIG. 7 shows engineering stress versus elongation for elastomers formed by frontal polymerization with less than 30 vol. % COD.

Further increasing the DCPD volume fraction leads to drastically different room temperature mechanical behavior for copolymers with less than 30 vol. % COD, and more specifically 25 vol. % COD or less, where the $T_g$ is at or above room temperature, as indicated in FIG. 4. These copolymers yield at small strains (about 5%), as illustrated in FIG. 7, followed by irrecoverable plastic deformation until failure, which may be described as cold drawing behavior.

Figure 8:
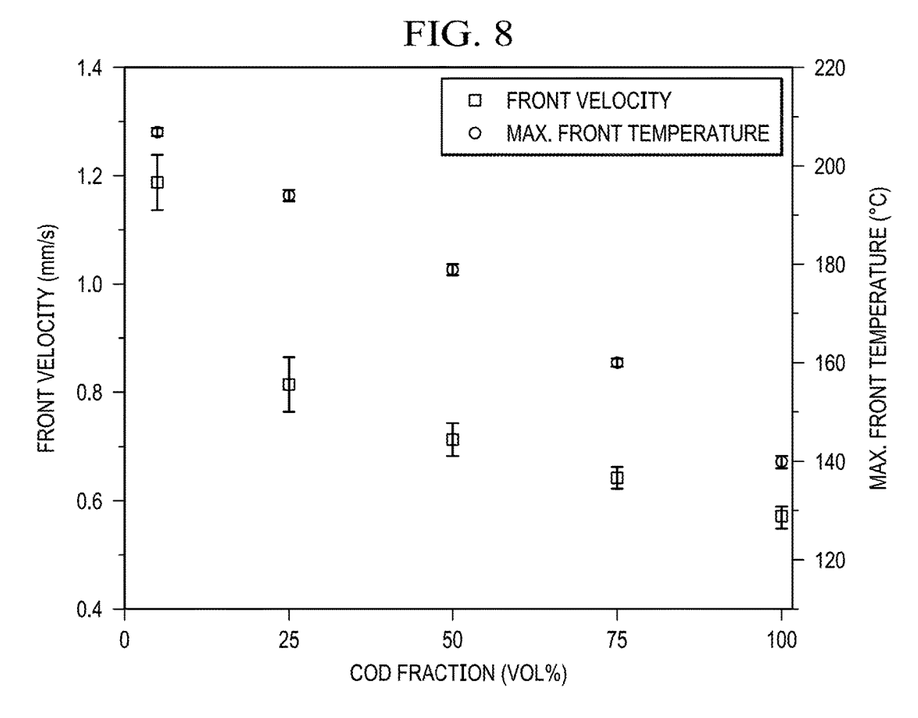
FIG. 8 shows the variation in front velocity and maximum front temperature with COD volume fraction.

In addition to influencing crystallization behavior, glass transition temperature and/or the mechanical properties of the frontally-polymerized elastomer, the addition of DCPD to the monomer solution comprising COD can alter the frontal polymerization process. In particular, due to the higher ring strain of DCPD (90 kJ/mol) compared to COD (56 kJ/mol), the monomer solution may have increased reactivity, promoting an increase in the front velocity (e.g., from about 0.6 mm/s to about 1.2 mm/s) and also the maximum front temperature (e.g., from about 140° C. to about 210° C.). Both of these increases occur monotonically with DCPD fraction, as demonstrated by the data of FIG. 8 for elastomers prepared by frontal polymerization of monomer solutions containing from 5 vol. % COD (95 vol. % DCPD) to 100 vol. % COD (0 vol. % DCPD). Notably, downstream of the polymerization front, the monomer solution may be at room temperature (e.g., 20-25° C.) or at another temperature above or below room temperature that is well below the temperature at the polymerization front. In contrast to prior work, the entire monomer solution need not undergo external heating to a high temperature (e.g., 200° C. or higher) for polymerization to occur; instead, the monomer solution undergoes localized heating as the polymerization front propagates. Advantageously, after frontal polymerization, heat dissipates rapidly.

The ability to manipulate the $T_g$ and mechanical properties of the frontally-polymerized elastomer by changing the COD-DCPD co-monomer ratio may enable the fabrication of one-way shape memory polymers having a predetermined actuation temperature. A shape memory polymer may have a $T_g$ above room temperature, where the $T_g$ may correspond to the actuation temperature for shape recovery; a shape memory polymer is able to "remember" and recover a permanent or original shape by heating at or above the actuation temperature. The permanent shape may be remembered through chemical crosslinks fixed at the time of frontal polymerization. A temporary shape can be established by deforming the frontally-polymerized elastomer at or above the $T_g$ and maintaining the deformation while cooling to room temperature (or to another temperature below the $T_g$), and the permanent shape may be restored upon heating at or above the $T_g$. As described above, the $T_g$ of a frontally-polymerized elastomer may be determined by the COD to DCPD volume ratio.

An elastomer (or copolymer) having a spatially-varying $T_g$ or a gradient in $T_g$ may also be fabricated by frontal polymerization. In other words, an elastomer having multiple portions or layers, where each portion or layer has a different $T_g$, may be prepared by frontal polymerization. In an example where the different $T_g$ of each layer is above room temperature, such an elastomer may function as a shape memory polymer that can be actuated sequentially so as to recover a permanent shape in a controlled heating process, as discussed further below. In an example where the different $T_g$ of each layer is below room temperature, the elastomer may exhibit elastomeric behavior at room temperature, with each layer exhibiting different mechanical properties (e.g., tensile strength, elongation at failure). In another example, the elastomer may have one or more layers each having a different $T_g$ above room temperature and one or more other layers each having a different $T_g$ below room temperature, such that the elastomer exhibits a desired combination of elastomeric and cold drawing properties at room temperature.

Elastomers with a gradient in $T_g$ may be prepared from monomer solutions including multiple portions or layers, where each portion comprises a co-monomer mixture with a different volume percentage of COD. Due to density differences between COD (0.88 g/mL) and DCPD (0.98 g/mL), the multiple portions or layers may be arranged in a vertical stack where mixing between portions or layers is substantially avoided, even though each layer may be in the liquid state. Each layer has a different volume percent of COD and thus a different density, and the vertical stack may be arranged with the highest-density layer on the bottom, followed by the next-highest density layer, etc., to the lowest density layer at the top, such that the density of the layers decreases monotonically from bottom to top. In other words, the COD volume fraction increases from bottom to top, as shown for example in FIG. 9A, and the DCPD fraction decreases from bottom to top. Such an arrangement can inhibit or prevent gravity-induced mixing between portions or layers, thereby ensuring that the layers are separate and distinct. The arrangement also promotes forming an elastomer that exhibits a monotonic increase or decrease (monotonic gradient) in a particular characteristic or property, such as composition, $T_g$, tensile strength, elongation at failure, etc. across the layers. Diffusion-induced mixing may be limited or prevented by the rapid propagation of the reaction front once frontal polymerization is initiated.

After preparation of the monomer solution including multiple portions or layers as described above, a region of the monomer solution may be activated to initiate frontal polymerization, leading to formation of a an elastomer or shape memory polymer including multiple portions or layers, where each portion comprises a different composition (based on the vol. % COD) and, consequently, a different $T_g$, as discussed above. The frontally-polymerized elastomer may thus be described as having a gradient in composition, $T_g$, and/or one or more properties. The gradients may be described as monotonic gradients and/or step function gradients since, as explained above, gravity- and diffusion-induced mixing between layers is minimized or avoided such that the layers remain separate and distinct.

Figure 9A:
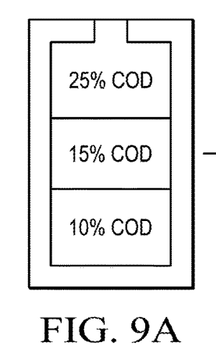
FIG. 9A shows a co-monomer mixture comprising multiple layers, where each layer includes a different COD volume fraction.
Figure 9B:
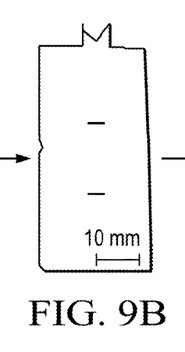
FIG. 9B shows an elastomer formed from by frontal polymerization of the co-monomer mixture of FIG. 9A; the elastomer may function as a shape memory polymer.
Figure 9C:
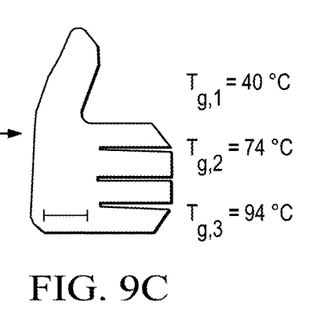
FIG. 9C shows the elastomer of FIG. 9B after further processing into a desired shape (a "SMP hand").

Preferably, for an elastomer intended for use as a shape memory polymer, the different $T_g$ of each layer is above room temperature. For example, one layer might have a $T_g$ of 30° C.; one might have a $T_g$ of 35° C., and another might have a $T_g$ of 50° C., etc. As a demonstration, a shape memory polymer having a spatial variation of $T_g$ is fabricated by layering multiple co-monomer mixtures having COD fractions of 25, 15 and 10 vol. %, respectively, as illustrated in FIG. 9A, to form a monomer solution that is then activated to initiate frontal polymerization. Frontal polymerization is completed within about one minute due to the rapid movement of the polymerization front through the monomer solution. The result, shown in FIG. 9B, is a shape memory polymer having a predetermined gradient in composition (e.g., in COD volume percentage) and in $T_g$, with values of 40° C., 74° C. and 94° C., respectively, as estimated by the Fox equation. After polymerization, the gradient shape memory polymer may be cut into a desired shape, such as a hand facsimile as shown in FIG. 9C, having a spatial variation in $T_g$.

Figure 10:
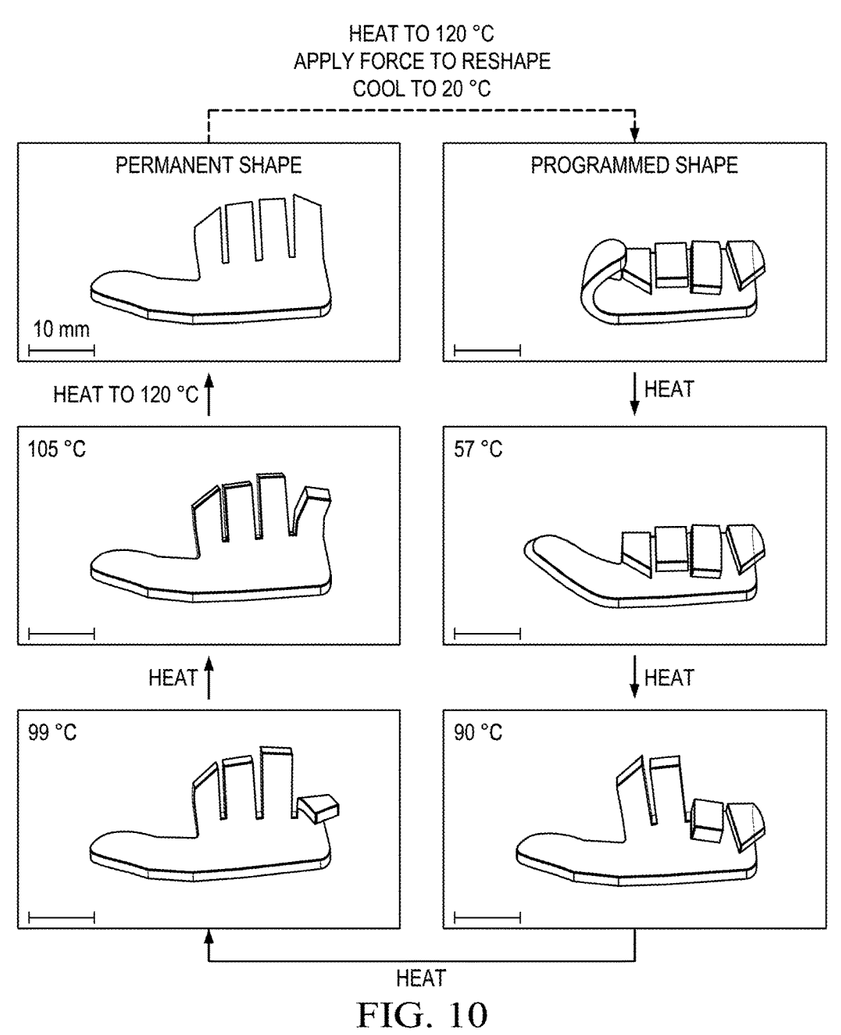
FIG. 10 shows sequential actuation of the frontally polymerized SMP hand of FIG. 9C.

Sequential actuation of the frontally-polymerized shape memory polymer (SMP) hand is demonstrated in FIG. 10. At 120° C., which lies above the greatest $T_g$, the SMP hand is deformed into a fist, followed by rapid cooling to 20° C., which lies below the lowest $T_g$, to fix the temporary shape. Then, the digits of the first open in a predetermined order in response to uniform environmental heating from 20° C. to 120° C., restoring the original or permanent shape of the SMP hand. Additional shape memory cycles are carried out with the same sample programmed into different temporary shapes demonstrating the capability to recover the permanent shape from any number of temporary shapes.

Figure 11:
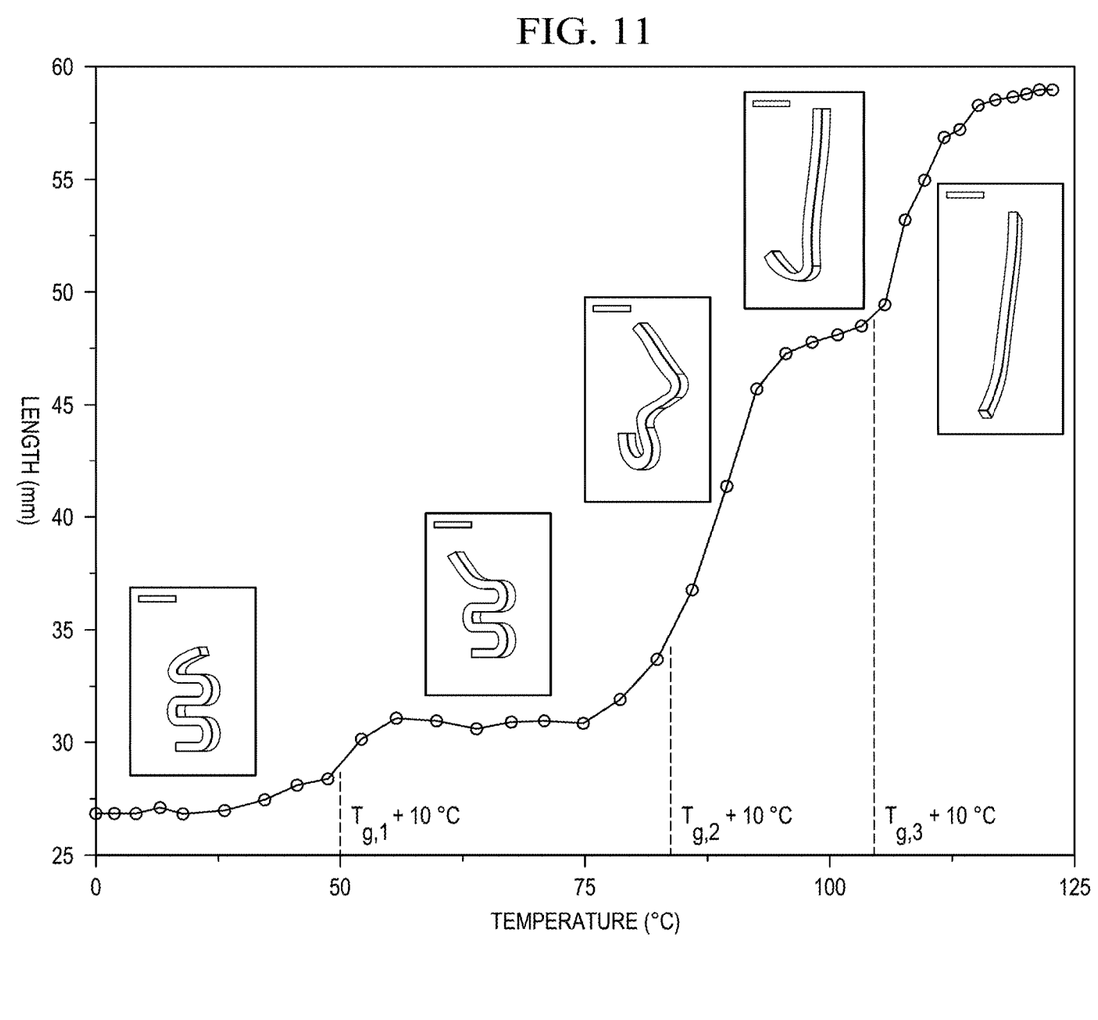
FIG. 11 shows sequential actuation of a frontally polymerized shape memory polymer in the form of a strip ("SMP strip") having a gradient in composition and $T_g$.

To further investigate the shape memory recovery process, the transition behavior is studied by measuring the end-to-end length of a three-layer gradient SMP strip with the same spatial variation in $T_g$ (values of 40° C., 74° C. and 94° C., respectively) as the above-described SMP hand. As shown in FIG. 11, the length of the SMP strip rapidly increases in the temperature ranges corresponding to $T \approx T_g +$ 10° C. for each of the three layers, demonstrating that shape memory actuation of the frontally polymerized shape memory polymer encompasses three distinct and sequential processes, rather than a continuous process. The wide temperature range between actuation events allows selective actuation of each region.

Experimental Details

Chemicals. 1,5-Cyclooctadiene (COD) and tributyl phosphite (TBP) are obtained from Tokyo Chemical Industry (TCI). endo-dicyclopentadiene (DCPD), second-generation Grubbs catalyst (GC2), and phenylcyclohexane are obtained from Sigma-Aldrich. To prepare the monomer for frontal polymerization, DCPD (solid at room temperature) is melted in an oven at 60° C. and then mixed with desired amount of COD, by volume, to obtain the co-monomer mixtures with 5-100 vol. % of COD. The composition of the co-monomer mixtures (and corresponding copolymers) are given in volume %, unless otherwise mentioned. The addition of at least 5 vol. % COD is observed to lower the melting point of DCPD below room temperature, yielding liquid co-monomer mixtures suitable for frontal polymerization. Prior to initiating polymerization, COD and all co-monomer mixtures are purified by passing them through basic alumina plugs to remove inhibitors (such as butylated hydroxytoluene, BHT). All other chemicals are used as received without further purification.

Liquid monomer solution preparation. The necessary amount of pure COD or co-monomer mixture is measured out in a scintillation vial. In a separate vial, GC2 (0.625 mg per mL of monomer for these experiments) is dissolved in phenylcyclohexane (50 μL per mg GC2) and the mixture is sonicated for 10 minutes. Unless otherwise mentioned, 1 equiv of TBP (0.319 μL per mg GC2) is added to the GC2 solution and then combined with the monomer. To a 13×100 mm test tube, 8 mL of the mixture is immediately transferred, and frontal polymerization is initiated from the top of the test tube using a soldering-iron tip to supply the transient heat.

Front velocity and temperature measurements. A video of the propagation of the front is recorded and frontal velocity is calculated using the slope of the best fit line of position versus time. To measure the maximum front temperature, a T-type thermocouple (TMQSS, Omega) is inserted and fixed at the center of the test tube before initiating frontal polymerization. GPC and NMR measurements. Small pieces of crystallized FPCOD are collected from three samples of different batches for analysis. Each sample is dissolved by stirring overnight, at 10 mg mL$^{-1}$ concentration, in either HPLC grade THF (for GPC) or CDCl3 (for NMR), both containing ca. 5 vol. % of ethyl vinyl ether to quench the metathesis reaction. GPC is measured by a Waters Breeze 2 systems with Styragel HR columns and tetrahydrofuran (THF, HPLC grade, contains 100 ppm BHT) as eluent (1 mg mL$^{-1}$ flow rate). The molecular weight and dispersity are determined by a calibration curve from polystyrene standards (from PSS-Polymer Standards Service). 1H NMR is measured by Bruker Ascend 500 MHz instrument.

Differential scanning calorimetry (DSC). The heat of reaction (Hr) for ROMP of 100% COD is determined via DSC measurements on freshly prepared samples (2-3 mg each) with 90 ppm GC2 and 100 ppm TBP. The measurements are performed using a TA Instruments Discovery DSC250 from −50 to 200° C. at ramp rates of 5, 7, 10, and 15° C. min$^{-1}$. The heat of reaction is calculated by integrating heat flow versus time between 10 and 150° C. after baseline correction. Glass transition temperature (T$_g$) is determined via DSC measurements on frontally polymerized samples (5-10 mg each). For 5%-75% COD samples, the measurements are performed using a TA Instruments Discovery DSC250 with a refrigerated cooling system, which has a lower temperature limit of −90° C. Copolymer DSC T$_g$ results are fit to the Fox equation:

$$T_{g,copolymer} = \left(\frac{w_{COD}}{T_{g,PCOD}} + \frac{w_{DCPD}}{T_{g,PDCPD}}\right)^{-1}$$

where $w_i$ is the monomer weight fraction. For 100% COD samples, the measurements are performed using a TA Instruments Q20 DSC with a liquid nitrogen cooling system, which can access temperatures below −130 °C. Heat-cool-heat cycles are performed at 10° C. min$^{-1}$ in the appropriate temperature range, and the T$_g$ is taken as the inflection point of the first heat cycle. The degree of cure (α) for FPCOD samples is calculated by the following equation:

$$\alpha = 1 - \frac{H_{residual}}{H_r}$$

where H$_r$ is the heat of reaction determined above, and H$_{residual}$ is determined by integrating residual heat flow versus time for the first heat cycle between 50 and 150° C. after baseline correction.

Dynamic mechanical analysis (DMA). Copolymer samples are frontally polymerized in molds which are preheated to 60° C., and then cut into strips with approximate dimensions of 0.8×4×30 mm using razor or scissor blades. Temperature ramps are performed in tension using a TA Instruments RSA-G2 DMA with a refrigerated cooling system. All tests are performed with 5° C. min$^{-1}$ ramp rate, 10 mm fixture gap, 1 Hz frequency, and 0.1% strain. T$_g$ is defined as the maximum of tan(δ), and the approximate molecular weight between crosslinks (M$_c$) is calculated by the following equation:

$$M_c = \frac{3\rho RT}{E'_{T_g+70K}}$$

where ρ is density and R is the universal gas constant.

Tensile testing. ASTM standard D638 type IV dogbone samples are frontally polymerized in molds which are preheated to 50° C. Tensile tests are performed at room temperature on the dogbone samples using an Instron 5984 universal testing system equipped with a 5 kN cell and a video extensometer. Samples are subjected to an extension rate of 50 mm min$^{-1}$ until failure. Tensile modulus is calculated in the linear region between 0-1 strain. Outside the range of the video extensometer, the elongation is calculated from the crosshead displacement.

Gradient copolymer fabrication. Three 1 mL portions of liquid resin containing 10%, 15% and 25% COD, respectively, are sequentially added by a syringe into a rectangular glass mold with a thickness of 0.2 mm. Since COD has a lower density than DCPD, the density of the upper layer is smaller than that of lower layer. Therefore, careful injection prevents mixing and a three-layer liquid preparation is achieved. Frontal polymerization is initiated from the top by a soldering iron. After frontal polymerization is finished and the elastomer cools down, the elastomer is removed from the mold and cut into desired shapes.

Shape memory tests. The original (permanent) shape is determined by the shape of the mold during frontal polymerization and subsequent cutting operations. The programmed (temporary) shape is prepared by heating the gradient sample to 120° C. (above the highest T$_g$), deforming the sample to the desired shape, and maintaining this shape while cooling to room temperature. To recover the original shape, the sample is uniformly heated to 120° C. (e.g., in an oven).

The subject matter of this disclosure may relate to the following aspects:

A first aspect relates to a method of rapidly forming an elastomer, the method comprising: preparing a monomer solution comprising a catalyst and one or more monomers including 1,5-cyclooctadiene (COD); activating a region of the monomer solution to initiate an exothermic polymerization reaction and generate a self-propagating polymerization front, wherein the self-propagating polymerization front moves through the monomer solution and polymerizes the one or more monomers, thereby rapidly forming an elastomer.

A second aspect relates to the method of the first aspect, wherein the one or more monomers further comprise dicyclopentadiene (DCPD).

A third aspect relates to the method of the second aspect, wherein the COD and the DCPD have a predetermined volume ratio in the monomer solution.

A fourth aspect relates to the method of any of the first through the third aspects, wherein the monomer solution is in a liquid state until the polymerization front passes through.

A fifth aspect relates to the method of any of the first through the fourth aspects, wherein, prior to passage of the polymerization front, the monomer solution has a storage modulus of less than 1 Pa.

A sixth aspect relates to the method of any of the first through the fifth aspects, wherein the activation takes place within two hours of preparing the monomer solution.

A seventh aspect relates to the method of any of the first through the sixth aspects, wherein the catalyst comprises a ruthenium catalyst.

An eighth aspect relates to the method of any of the first through the seventh aspects, wherein preparing the monomer solution comprises forming a mixture of the one or more monomers, the catalyst and an inhibitor.

A ninth aspect relates to the method of the eighth aspect, wherein the mixture further comprises an organic solvent.

A tenth aspect relates to the method of eighth or ninth aspect, wherein the inhibitor is selected from the group consisting of: trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF).

An eleventh aspect relates to the method of any of the first through the tenth aspects, wherein the preparing further comprises purifying the one or more monomers.

A twelfth aspect relates to the method of the eleventh aspect, wherein the purification comprises passing the one or more monomers through basic alumina.

A thirteenth aspect relates to the method of any of the first through the twelfth aspects, wherein a temperature of the polymerization front is in a range from about 140° C. to about 210° C.

A fourteenth aspect relates to the method of any of the first through the thirteenth aspects, wherein the velocity of the polymerization front is in a range from about 0.6 mm/s to about 1.2 mm/s.

A fifteenth aspect relates to the method of any of the first through the fourteenth aspects, wherein the elastomer comprises poly(1,4-butadiene).

A sixteenth aspect relates to the method of any of the first through the fifteenth aspects, wherein the elastomer comprises a copolymer.

A seventeenth aspect relates to the method of any of the first through the sixteenth aspects, wherein the elastomer exhibits elastomeric behavior at room temperature.

An eighteenth aspect relates to the method of any of the first through the seventeenth aspects, wherein the elastomer exhibits cold drawing behavior at room temperature.

A nineteenth aspect relates to the method of any of the first through the eighteenth aspects, wherein the elastomer comprises a shape memory polymer.

A twentieth aspect relates to the method of any of the first through the nineteenth aspects, wherein the one or more monomers comprise at least 30 vol. % COD.

A twenty-first aspect relates to the method of any of the first through the twentieth aspects, wherein the one or more monomers comprise from 30 vol. % COD to 40 vol. % COD.

A twenty-second aspect relates to the method of any of the first through the twenty-first aspects, wherein the elastomer has a glass transition temperature below room temperature.

A twenty-third aspect relates to the method of any of the first through the twenty-second aspects, wherein the one or more monomers comprise less than 30 vol. % COD.

A twenty-fourth aspect relates to the method of any of the first through the twenty-third aspects, wherein the elastomer has a glass transition temperature above room temperature.

A twenty-fifth aspect relates to the method of any of the first through the twenty-fourth aspects, wherein the monomer solution comprises more than one layer arranged in a vertical stack, each layer comprising the one or more monomers with a different volume percentage of the COD A twenty-sixth aspect relates to the method of any of the first through the twenty-fifth aspects, wherein the elastomer comprises more than one layer, each layer comprising a different glass transition temperature.

A twenty-seventh aspect relates to the method of the twenty-sixth aspect, wherein the different glass transition temperature of each layer is above room temperature, and wherein the elastomer comprises a shape memory polymer configured for sequential actuation.

A twenty-eighth aspect relates to the method of the twenty-sixth aspect, wherein the different glass transition temperature of each layer is below room temperature, and wherein the elastomer comprises an elastomeric polymer where each layer comprises different mechanical properties at room temperature.

A twenty-ninth aspect relates to the method of any of the first through the twenty-eighth aspects, wherein the activating comprises exposing the region to heat, light and/or electric current.

A thirtieth aspect relates to the method of any of the first through the twenty-ninth aspects, wherein the monomer solution is contained in a mold or other container.

A thirty-first aspect relates to an elastomer having tunable properties, the elastomer comprising polybutadiene or a copolymer and being formed by: preparing a monomer solution comprising one or more monomers including 1,5-cyclooctadiene (COD); activating a region of the monomer solution to initiate an exothermic polymerization reaction and generate a self-propagating polymerization front, wherein the self-propagating polymerization front moves through the monomer solution and polymerizes the one or more monomers, thereby rapidly forming the elastomer.

A thirty-second aspect relates to the elastomer of the thirty-first aspect comprising poly(1,4-butadiene).

A thirty-third aspect relates to the elastomer of the thirty-first or thirty-second aspect comprising the copolymer, wherein the one or more monomers of the monomer solution further include dicyclopentadiene (DCPD).

A thirty-fourth aspect relates to the elastomer of any of the thirty-first through the thirty-third aspects, wherein the COD and the DCPD have a predetermined volume ratio in the monomer solution.

A thirty-fifth aspect relates to the elastomer of any of the thirty-first through the thirty-fourth aspects comprising a glass transition temperature below room temperature, wherein the one or more monomers of the monomer solution comprise at least 30 vol. % COD.

A thirty-sixth aspect relates to the elastomer of the thirty-fifth aspect comprising a tensile strength in a range from about 3 MPa to about 20 MPa and/or an elongation at failure in a range from about 300% to about 520% at room temperature.

A thirty-seventh aspect relates to the elastomer of any of the thirty-first through the thirty-fourth aspects comprising a glass transition temperature above room temperature, wherein the one or more monomers of the monomer solution comprise less than 30 vol. % COD.

A thirty-eighth aspect relates to the elastomer of the thirty-seventh aspect being a shape memory polymer.

A thirty-ninth aspect relates to the elastomer of any of the thirty-first through the thirty-eighth aspects comprising a gradient in composition, a gradient in glass transition temperature, and/or a gradient in mechanical properties.

A fortieth aspect relates to a method of rapidly forming an elastomer with tunable properties, the method comprising: preparing a liquid monomer solution comprising a catalyst and monomers including 1,5-cyclooctadiene (COD) and dicyclopentadiene (DCPD), the monomers having a predetermined volume ratio in the liquid monomer solution; activating a region of the liquid monomer solution to initiate an exothermic polymerization reaction and generate a self-propagating polymerization front, wherein the self-propagating polymerization front moves through the monomer solution and polymerizes the one or more monomers, thereby rapidly forming an elastomer having predetermined properties.

Although the present invention has been described in considerable detail with reference to certain embodiments thereof, other embodiments are possible without departing from the present invention. The spirit and scope of the appended claims should not be limited, therefore, to the description of the preferred embodiments contained herein.

All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of rapidly forming an elastomer, the method comprising:
   preparing a monomer solution comprising a catalyst and one or more monomers including 1,5-cyclooctadiene (COD);
   activating a region of the monomer solution to initiate an exothermic polymerization reaction and generate a self-propagating polymerization front,
   wherein the self-propagating polymerization front moves through the monomer solution and polymerizes the one or more monomers, thereby rapidly forming an elastomer.

2. The method of claim 1, wherein the one or more monomers further comprises dicyclopentadiene (DCPD), and
   wherein the COD and the DCPD have a predetermined volume ratio in the monomer solution.

3. The method of claim 1, wherein the elastomer comprises poly (1,4-butadiene) or a copolymer.

4. The method of claim 1, wherein the one or more monomers comprises at least 30 vol % COD.

5. The method of claim 4, wherein the one or more monomers comprises from 30 vol % COD to 40 vol % COD.

6. The method of claim 1, wherein the elastomer has a glass transition temperature below room temperature.

7. The method of claim 1, wherein the one or more monomers comprises less than 30 vol % COD.

8. The method of claim 1, wherein the elastomer has a glass transition temperature above room temperature.

9. The method of claim 1, wherein the monomer solution comprises more than one layer arranged in a vertical stack, each layer comprising the one or more monomers with a different volume percentage of the COD.

10. The method of claim 1, wherein the elastomer comprises more than one layer, each layer comprising a different glass transition temperature.

11. The method of claim 10, wherein the different glass transition temperature of each layer is above room temperature, and
    wherein the elastomer comprises a shape memory polymer configured for sequential actuation.

12. The method of claim 10, wherein the different glass transition temperature of each layer is below room temperature, and
    wherein the elastomer comprises an elastomeric polymer where each layer comprises different mechanical properties at room temperature.

13. An elastomer having tunable properties, the elastomer comprising polybutadiene or a copolymer and being formed by:
    preparing a monomer solution comprising one or more monomers including 1,5-cyclooctadiene (COD);
    activating a region of the monomer solution to initiate an exothermic polymerization reaction and generate a self-propagating polymerization front,
    wherein the self-propagating polymerization front moves through the monomer solution and polymerizes the one or more monomers, thereby rapidly forming the elastomer,
    wherein the elastomer comprises a gradient in composition, a gradient in glass transition temperature, and/or a gradient in mechanical properties.

14. The elastomer of claim 13 comprising poly (1,4-butadiene), or
    comprising the copolymer, wherein the one or more monomers of the monomer solution further includes dicyclopentadiene (DCPD).

15. The elastomer of claim 13 comprising a glass transition temperature below room temperature,
    wherein the one or more monomers of the monomer solution comprises at least 30 vol % COD.

16. The elastomer of claim 15, comprising a tensile strength in a range from about 3 MPa to about 20 MPa and/or an elongation at failure in a range from about 300% to about 520% at room temperature.

17. The elastomer of claim 13 comprising a glass transition temperature above room temperature,
    wherein the one or more monomers of the monomer solution comprises less than 30 vol % COD.

18. The elastomer of claim 17, wherein the elastomer is a shape memory polymer.

19. A method of rapidly forming an elastomer with tunable properties, the method comprising:
    preparing a liquid monomer solution comprising a catalyst and monomers including 1,5-cyclooctadiene (COD) and dicyclopentadiene (DCPD), the monomers having a predetermined volume ratio in the liquid monomer solution;
    activating a region of the liquid monomer solution to initiate an exothermic polymerization reaction and generate a self-propagating polymerization front,
    wherein the self-propagating polymerization front moves through the monomer solution and polymerizes the one or more monomers, thereby rapidly forming an elastomer having predetermined properties.

20. An elastomer having tunable properties, the elastomer comprising polybutadiene or a copolymer and being formed by:
    preparing a monomer solution comprising one or more monomers including 1,5-cyclooctadiene (COD);
    activating a region of the monomer solution to initiate an exothermic polymerization reaction and generate a self-propagating polymerization front,
    wherein the self-propagating polymerization front moves through the monomer solution and polymerizes the one or more monomers, thereby rapidly forming the elastomer,
    wherein the elastomer is a shape memory polymer.

* * * * *